United States Patent [19]

McMullen

[11] 4,281,806
[45] Aug. 4, 1981

[54] FISHING LEADER STORAGE REEL

[76] Inventor: Edward D. McMullen, El Sobrante, Calif. 94803

[21] Appl. No.: 79,714

[22] Filed: Sep. 28, 1979

Related U.S. Application Data

[63] Continuation-in-part of Ser. No. 924,156, Jul. 13, 1978, abandoned.

[51] Int. Cl.³ .............................................. B65H 75/28
[52] U.S. Cl. ................................ 242/125.1; 242/137.1
[58] Field of Search .......... 242/125.1, 125.2, 137–138, 242/96, 68, 118.4; 43/54.5 R, 57.5 R; 206/402, 407, 409

[56] References Cited

U.S. PATENT DOCUMENTS

| 2,268,547 | 1/1942 | Haines | 242/137.1 |
| 2,501,425 | 3/1950 | Valentine | 43/57.5 R |
| 2,763,957 | 9/1956 | Roberts | 43/57.5 |
| 3,039,226 | 6/1962 | Bagdonas | 43/57.5 R |
| 3,184,180 | 5/1965 | Rockwell | 242/86 |

FOREIGN PATENT DOCUMENTS

| 93666 | 9/1962 | Denmark | 242/55.53 |
| 991765 | 10/1951 | France | 242/137.1 |

Primary Examiner—Leonard D. Christian
Attorney, Agent, or Firm—Edward Brosler; Merwyn Brosler

[57] ABSTRACT

A device for the storage of pretied fishing leaders comprised of a reel having two sides separated by a plurality of radially situated spacers equally spaced from and about the center axis of such reel and a housing that rotatably locks with the reel such that it may be turned within the housing to serially wind a number of fishing leaders loosely about such spacers to prevent them from tangling.

8 Claims, 5 Drawing Figures

FISHING LEADER STORAGE REEL

INVENTION

This is a continuation-in-part application based on application Ser. No. 924,156, filed July 13, 1978 entitled FISHING LEADER STORAGE REEL and now abandoned.

My invention relates to fishing gear and more particularly to a means for storing and retrieving a plurality of pretied fishing leaders in such a manner that they are not apt to become tangled within themselves or each other.

It is found that these leaders, with the accompanying hook loops and swivels which form parts of these leaders, when not in use generally found their way to the bottom of a fishing tackle box and eventually became tangled within themselves and other leaders to a degree that they oft time became unsalvagable.

Attempts to hook several of these leaders together and wind them upon a conventional spool with a solid hub did not solve the problem as there is a tendency during winding for the hook loops and swivels to wedge tightly under preceeding turns due to the solid hub, preventing easy removal.

Among the objects of my invention are:

(1) To provide a new and improved apparatus for winding pretied fishing leaders for storage;

(2) To provide a new and improved apparatus for winding pretied leaders so they are not apt to become entangled;

(3) To provide a new and improved apparatus for winding pretied fishing leaders that is easily storageable;

(4) To provide a new and improved apparatus for winding pretied fishing leaders that include means for easy winding of such fishing leaders.

Additional objects of my invention will be brought out in the following description of a preferred embodiment of the same taken in conjunction with the accompanying drawings, wherein FIG. 1 is a top view in elevation of the invention;

Figure 1:
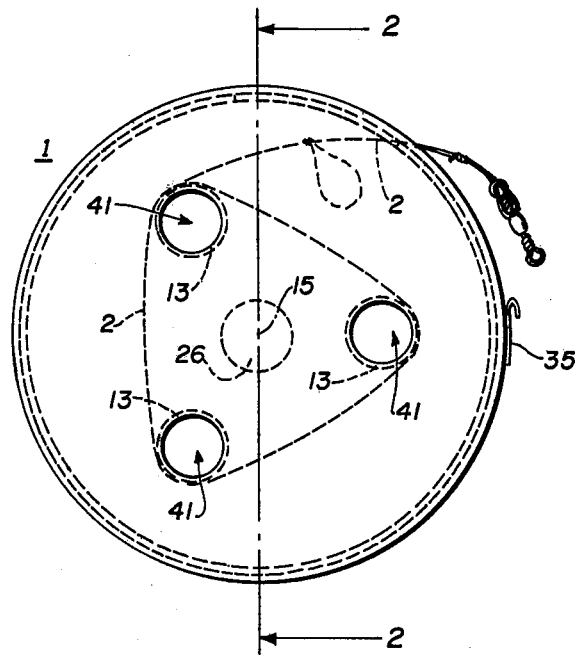
Figure 2:
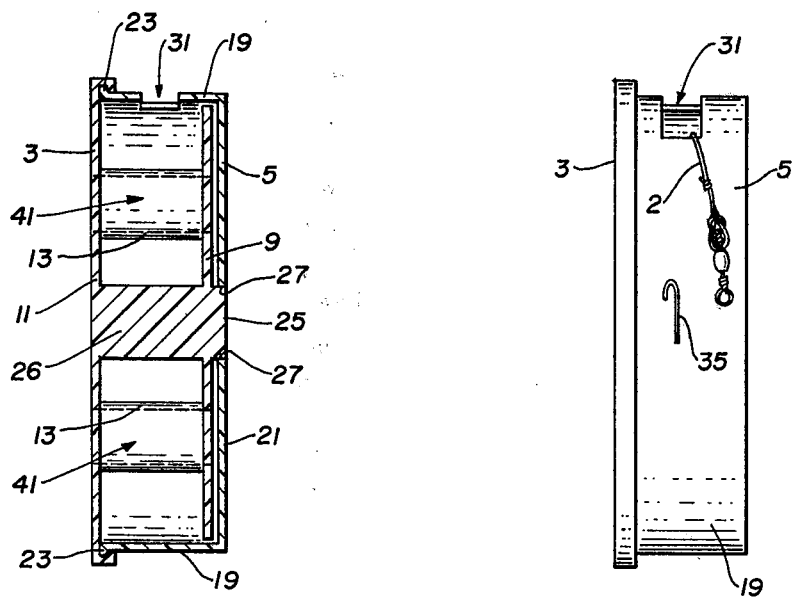
FIG. 2 is a side view in section taken through the plane 2—2 of FIG. 1.
Figure 3:
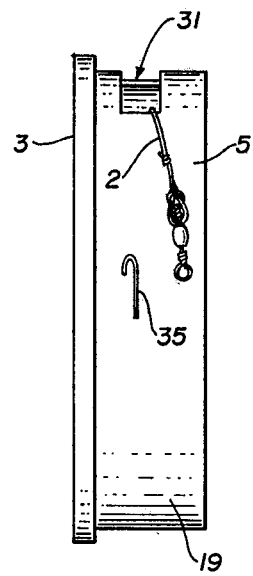
FIG. 3 is a side view in elevation of the invention of FIG. 1.
Figure 4:
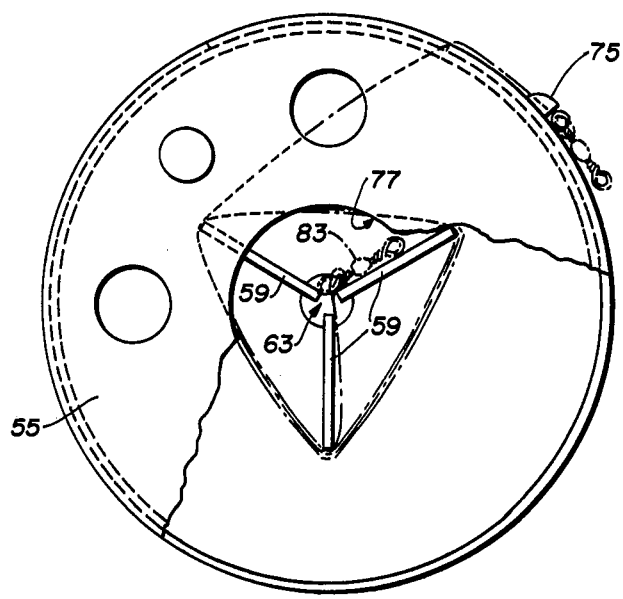
FIG. 4 is a top view of another embodiment of the invention with a section removed to expose the interior.
Figure 5:
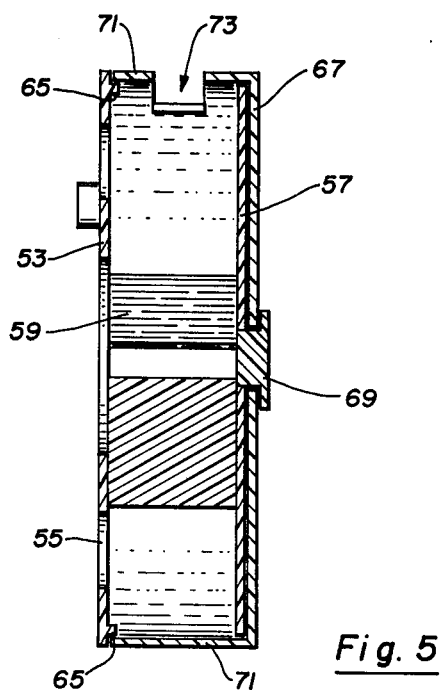
FIG. 5 is a side view in elevation of the embodiment of FIG. 4.

For details of my invention in its preferred form, reference will be had to the accompanying drawings wherein the invention comprises a reel assembly 1 having a means on which to wind pretied fishing leaders 2 comprising a reel 3 and a housing 5, the reel including means to snap-fit with the housing when the reel is inserted into the housing, this snap-fit enabling rotation of the reel within the housing, and means for manually engaging the housing with one hand while rotatably revolving the reel with respect to the housing with the other hand.

The reel comprises an inner wall 9 and an outer wall 11 interconnected by a plurality of posts 13 equally spaced from and about a center axis 15 of the reel.

In the preferred embodiment, the inner wall 9 takes the form of a narrow disc of slightly less diameter than the outer wall 11.

The housing comprises a peripheral wall 19 surrounding and perpendicular to an end wall 21, this peripheral wall terminating in a hooked shape 23 to snap with a corresponding shape of the periphery of outer wall 11 of the reel when the reel is inserted within the housing. This snap connection is loosely accomplished so that the reel is rotatable with the housing.

A protrusion 25 from the axial center of the inner wall of the reel, which could be an extension of a reel center post 26, rotatably aligns with an opening 27 in the axial center of the housing to provide rotatable support for that side of the reel when installed within the housing. This coupled with the rotatable snap connection on the other side of the reel prevents uneven forces during winding from causing binding of the reel within the housing when storing or retrieving the pretied leaders.

A slot 31 in the peripheral housing wall 19 exposes the reel within and provides an opening for entrance of the pretied leaders. A barbless hook 35 is located near the opening in the peripheral housing wall and is attached thereto by means of its stem, thus providing for a place to anchor the end of the last leader wound upon the reel.

At least one of the posts spacing the inner and outer wall of the reel has a hollow opening 41 exposed from the outer wall of the reel, large enough to receive one's finger or part thereof so that the housing may be grasped with one hand and the reel may be rotated within the housing with a finger of the other hand. This provides of means for winding the reel without the necessity of a special protruding handle which would hamper the stacking of the assembly.

In operation, a small piece of leader material having a swivel attachment at one end may be fastened at its other end to one of the posts. The reel may then be turned until the swivel end of the small piece of leader material winds around and drops through the slotted opening in the housing where a pretied leader may be attached thereto and continued to be loosely wound upon the posts. A second leader may be attached to the free swivel end of the first leader and accordingly also wound upon the posts. This procedure may be continued until there no longer is room within the housing.

Because the contact points of the leaders wound upon the posts in minimal and the diameter of posts is relatively large, the chances of the pretied leaders containing the loops and swivels becoming entangled or otherwise wedged or cinched behind other turns of the line become negligible. And because the free space between the posts does not support tangling, these pretied leaders will be virtually tangle free when wound loosely about such posts.

A second embodiment of the invention comprises a reel 53 with two circular walls 55, 57 spaced by three vanes 59 radiating from near the center point of the circular walls with the vane inner ends defining a central chamber 63 at the center of the reel.

One wall 55, larger than the other, includes a rib 65 slightly inward from its outer circular edge to provide guidance for the lip of a cup shaped housing 67 installed over the small wall 57 and maintained rotatably in position by a plug 69 loosely fitted through a central opening of a wall of the housing and wedged tighly into a central opening of the adjacent smaller wall 57 of the reel.

The peripheral wall of the housing 71, as in the first embodiment, includes a slotted opening 73 for entrance of the pretied leaders. To secure the free end of a series of connected pretied leaders, a notched projection 75 is raised perpendicular to the slotted opening edge to provide a snug friction grip to the line when wedged into the notch.

One of the superior features of this second embodiment is the means for initially securing the inner end of the leader material to the reel, such means being provided by the central chamber 63 defined by the inner ends of the vanes. The center of the larger circular wall 55 of the reel is provided with a large circular opening 77 to expose the central chamber and a good portion of one edge of all the vanes 59 so that an end of the leader material inserted through the slotted opening 73 in a peripheral wall of the housing may, with one's fingers, easily be retrieved through the large circular opening. An article larger than the space between adjacent vane ends attached to the end of the leader, such as a piece of lead split-shot or a swivel 83, may be lifted over the central chamber and deposited on the other side of an adjacent vane to wedge the article between the vane ends and prevent it from pulling through. The space between the radiating vanes is sufficient to house the article used to snag the line and keep it from interfering with the line wraped around the outer edges of the vanes.

Although illustrated and described as a means for storing pretied leaders, the device of the present invention also lends itself to other uses.

From the foregoing description of my invention in its preferred form, it will become apparent that the same is subject to alteration and modification without departing from the underlying principles involved, and I accordingly do not desire to be limited in my protection to the specific details illustrated and described except as may be necessitated by the appended claims.

I claim:

1. A reel assembly on which to wind pretied fishing leaders comprising a reel installed within a housing, means for rotatably locking said reel with respect to said housing when so installed therein, said reel comprising an inner and outer wall interconnected by a plurality of spacers for winding of said leaders thereabout, said spacers being equally spaced from and about the center axis of said reel, with the open distance between said spacers greatly exceeding the contact surface of said spacers by said leader material and said housing including a peripheral wall having a slot therein to provide access to said reel within, whereby such pretied fishing leaders may be fed through said slot to said reel for winding upon said spacers and means adjacent said slot for anchoring the free end of such leaders following the winding thereof.

2. A reel assembly in accordance with claim 1, characterized by means within said reel for initially anchoring said pretied fishing leaders, whereby, the initial end of said fishing leaders may be inserted through said slot in said peripheral wall and secured by said anchoring means.

3. A reel assembly in accordance with claim 2, characterized by said spacers comprising a plurality of radiating vanes and initial anchoring means including a chamber defined by the inner ends of said radiating vanes with an opening in said outer reel wall exposing said chamber and a portion of one edge of said vanes whereby, an article larger than the space between adjacent vane ends, tied to said initial end of said fishing leaders and inserted through said slot toward said chamber along a path defined by two adjacent vanes, lifted through said opening and deposited over said chamber between two other adjacent vanes, will lodge between said other adjacent vane ends to secure said fishing leaders to said reel.

4. A reel assembly in accordance with claim 1, characterized by said means adjacent said slot for anchoring such free end of such leaders after winding including a notched projection raised perpendicular to said peripheral wall proximate said slotted opening whereby such free end of such pretied leader may be wedged into said projection notch to prevent such leader end from being wound into said reel.

5. A reel assembly on which to wind pretied fishing leaders comprising a reel installed within a housing, means for rotatably locking said reel with respect to said housing when so installd therein, said reel comprising an inner and outer wall interconnected by a plurality of posts for winding of said leaders thereabout, said posts being equally spaced from and about the center axis of said reel with the free space between said posts greatly exceeding the contact surface of said posts by said leader material when wound around said posts and said housing including a peripheral wall surrounding an end wall with said reel inner wall including an axial protrusion in rotatable fit with said end wall when so installed therein to provide rotatable support for said reel at such point of rotatable fit.

6. A reel assembly on which to wind pretied fishing leaders comprising a reel and a housing, said reel including means to snap-fit with said housing when said reel is inserted into said housing, said snap-fit enabling rotation of said reel within said housing, said reel comprising an inner and outer wall interconnected by a plurality of posts for winding of said leaders thereabout, said posts being equally spaced from and about the center axis of said reel, said housing including a peripheral wall surrounding an end wall and said reel inner wall having an axial protrusion in rotatable fit with said end wall of said housing when installed therein for providing rotatable support for said reel at such point of rotatable fit, said peripheral housing wall including a slot for exposing said reel within, and a barbless hook having a stem with means for anchoring said hook at its stem to said peripheral wall of said housing with said hook in proximity to said peripheral slot, whereby, pretied leader may be fed through said slot for winding upon said posts and a free end of said leader anchored to said barbless hook.

7. A reel assembly having rotating means on which to wind pretied leader comprising a housing including a peripheral wall surrounding and perpendicular to an end wall, a reel including a pair of walls, means for a rotatable snap-fit connection between one of said reel walls and said perpendicular wall of said housing when said reel is inserted within said housing, and said reel including an axial protrusion in rotatable fit connection with the end wall of said housing, whereby said reel has balanced rotatable support within said housing.

8. A reel assembly on which to wind pretied fishing leaders comprising a reel installed within a housing, means for rotatably locking said reel with respect to said housing when so installed therein, said reel comprising an inner and outer wall interconnected by a plurality of posts for winding of said leaders thereabout, said posts being equally spaced from and about the center axis of said reel, with the free space between said posts greatly exceeding the contact surface of said posts by said leader material when wound around said posts and said housing including a peripheral wall having a slot therein to provide access to said reel within, whereby such pretied fishing leaders may be fed through said slot to said reel for winding upon said posts, and means adjacent said slot for anchoring the free end of such leaders following winding thereof upon said posts.

* * * * *